(12) United States Patent
Bhandiwad et al.

(10) Patent No.: US 8,619,801 B2
(45) Date of Patent: Dec. 31, 2013

(54) SHARING A TRANSMISSION CONTROL PROTOCOL PORT BY A PLURALITY OF APPLICATIONS

(75) Inventors: Pramod A. Bhandiwad, Bangalore (IN); Prashanto Dey, Hojai (IN); Sivakumar Krishnasamy, Dharmapuri (IN); Niranjan Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 13/193,694

(22) Filed: Jul. 29, 2011

(65) Prior Publication Data

US 2013/0028267 A1    Jan. 31, 2013

(51) Int. Cl.
*H04L 29/06* (2006.01)

(52) U.S. Cl.
USPC .......................................... 370/419

(58) Field of Classification Search
USPC .......................................... 370/419
See application file for complete search history.

(56) References Cited

U.S. PATENT DOCUMENTS

| | | | | |
|---|---|---|---|---|
| 6,044,402 A * | 3/2000 | Jacobson et al. | | 709/225 |
| 6,363,081 B1 | 3/2002 | Gase | | |
| 6,549,538 B1 | 4/2003 | Beck et al. | | |
| 2002/0087716 A1* | 7/2002 | Mustafa | | 709/236 |
| 2005/0021999 A1* | 1/2005 | Touitou et al. | | 713/200 |
| 2005/0039104 A1* | 2/2005 | Shah et al. | | 714/776 |
| 2006/0168262 A1* | 7/2006 | Frazer | | 709/230 |
| 2006/0176904 A1* | 8/2006 | Stewart et al. | | 370/467 |
| 2006/0230107 A1* | 10/2006 | Yu et al. | | 709/204 |
| 2007/0076744 A1* | 4/2007 | Tamatsu | | 370/445 |
| 2008/0013546 A1* | 1/2008 | Bhatt et al. | | 370/395.52 |
| 2008/0195701 A1* | 8/2008 | Venkatsubra et al. | | 709/203 |
| 2009/0074003 A1 | 3/2009 | Accapadi et al. | | |
| 2009/0135851 A1* | 5/2009 | Veillette | | 370/469 |
| 2009/0157848 A1 | 6/2009 | Khoo | | |
| 2011/0022790 A1* | 1/2011 | Fachan et al. | | 711/104 |
| 2012/0082096 A1* | 4/2012 | Cave et al. | | 370/328 |
| 2012/0327772 A1* | 12/2012 | Samuels et al. | | 370/235 |

OTHER PUBLICATIONS

"Net.TCP Port Sharing", http://msdn.microsoft.com [online], 2011 [accessed online Mar. 2, 2011], p. 2, URL: http://webcache.googleusercontent.com/search?q=cache:http://msdn.microsoft.com/en-us/library/ms734772.aspx.
"TCP Port Service Multiplexer (TCPMUX)", http://ip.com [online], Nov. 1988, [accessed online Mar. 9, 2011], p. 1, URL: http://ip.com/IPCOM/000001887.

* cited by examiner

*Primary Examiner* — Mark Rinehart
*Assistant Examiner* — Christopher R Crompton
(74) *Attorney, Agent, or Firm* — H. Barrett Spraggins; Katherine S. Brown; Biggers Kennedy Lenart Spraggins LLP (57) ABSTRACT

Methods, apparatuses, and computer program products for sharing a transmission control protocol (TCP) port by a plurality of applications are provided. Embodiments include receiving, by a transmission controller from a client, a first TCP packet that includes an indication of a new TCP connection for a TCP port; determining, by the transmission controller, an origination of the first TCP packet; identifying, by the transmission controller, a TCP sequence number range associated with the determined origination; selecting, by the transmission controller, an initial sequence number (ISN) within the identified TCP sequence number range; and sending, by the transmission controller to the client, a second TCP packet that includes the selected ISN.

13 Claims, 5 Drawing Sheets

SHARING A TRANSMISSION CONTROL PROTOCOL PORT BY A PLURALITY OF APPLICATIONS

BACKGROUND OF THE INVENTION

1. Field of the Invention

The field of the invention is data processing, or, more specifically, methods, apparatuses, and computer program products for sharing a transmission control protocol (TCP) port by a plurality of applications.

2. Description of Related Art

A common constraint for application layer protocols is the transmission control protocol (TCP) port. A long-standing assumption in operating systems is that each TCP port is assigned to only one application. Because ports may be dedicated to specific types of services, limiting TCP to single applications prevents multiple applications from providing the same type of service on a single TCP port.

SUMMARY OF THE INVENTION

Methods, apparatuses, and computer program products for sharing a transmission control protocol (TCP) port by a plurality of applications are provided. Embodiments include receiving, by a transmission controller from a client, a first TCP packet that includes an indication of a new TCP connection for a TCP port; determining, by the transmission controller, an origination of the first TCP packet; identifying, by the transmission controller, a TCP sequence number range associated with the determined origination; selecting, by the transmission controller, an initial sequence number (ISN) within the identified TCP sequence number range; and sending, by the transmission controller to the client, a second TCP packet that includes the selected ISN.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
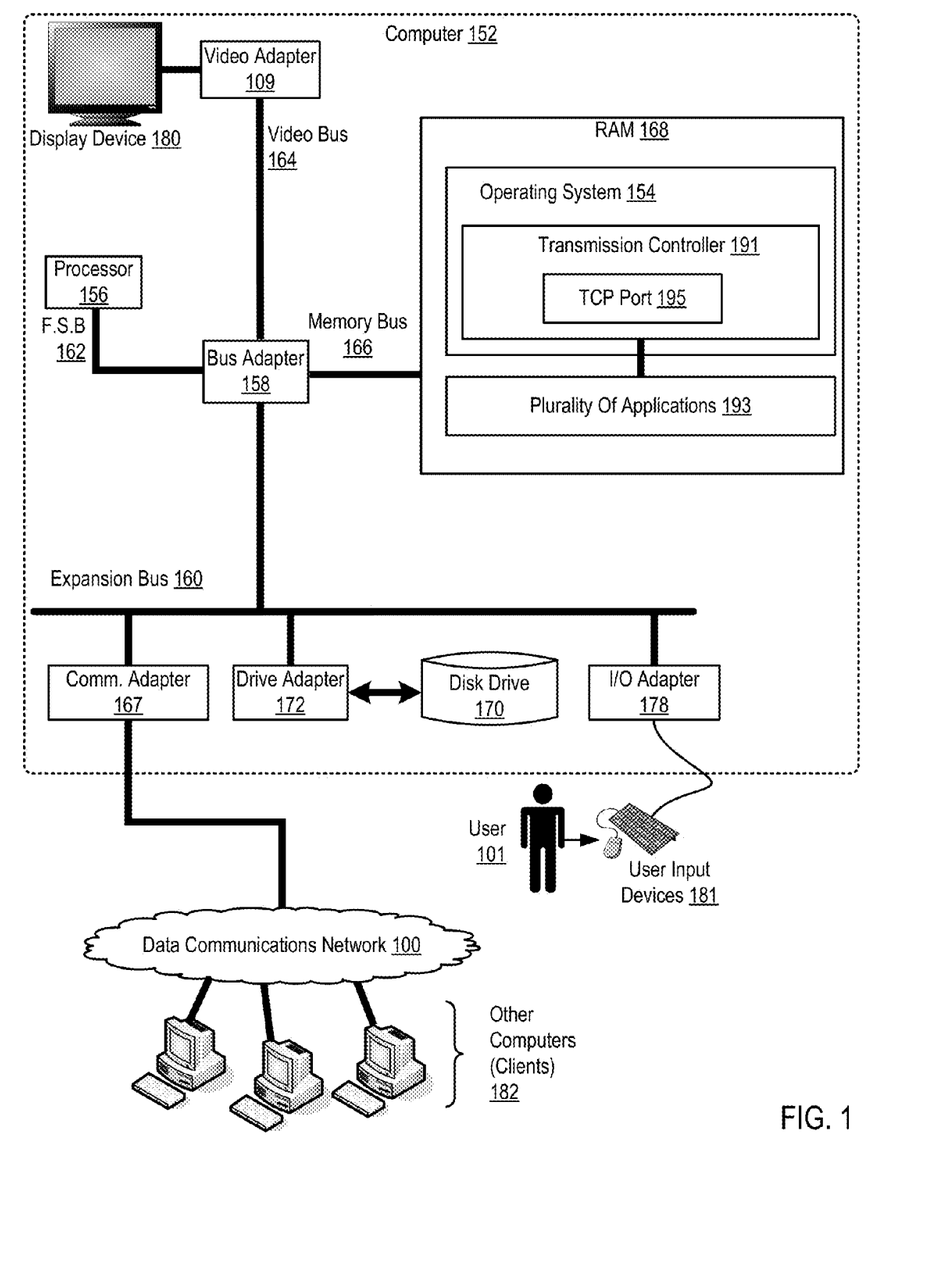
FIG. 1 sets forth a diagram of automated computing machinery comprising an exemplary computer useful in sharing a TCP port by a plurality of applications according to embodiments of the present invention.

Exemplary methods, apparatus, and products for sharing a transmission control protocol (TCP) port by a plurality of applications in accordance with the present invention are described with reference to the accompanying drawings, beginning with FIG. 1. Sharing a TCP port by a plurality of applications in accordance with the present invention is generally implemented with computers, that is, with automated computing machinery. FIG. 1 sets forth a diagram of automated computing machinery comprising an exemplary computer (152) useful in sharing a TCP port by a plurality of applications (193) according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an operating system (154). Operating systems useful sharing a TCP port by a plurality of applications according to embodiments of the present invention include invention include UNIX™, Linux™, Microsoft 7™, AIX™, IBM's i5/OS™, iOS™, Android™, and others as will occur to those of skill in the art. A TCP port is an application-specific software construct serving as a communications endpoint. Transport Layer protocols, such as TCP, specify a source and destination port number in their packet headers. A port number is a 16-bit unsigned integer, thus ranging from 0 to 65535. A process associates its input or output channel file descriptors (sockets) with a port number and an IP address, a process known as binding, to send and receive data via the network. The operating system (154) has the task of transmitting outgoing data from all ports onto the network, and forwarding arriving network packets to a process by matching the packet's IP address. A well-known range of port numbers is reserved by convention to identify specific service types on a host computer. In the client-server model of application architecture these reserved ranges are used to provide a multiplexing service on each port number that network clients connect to for service initiation, after which communication is reestablished on other connection-specific port numbers.

Applications implementing common services often use specifically reserved, well-known port numbers for receiving service requests from client hosts. This process is known as listening and involves the receipt of a request on the well-known port and reestablishing one-to-one server-client communications on another private port, so that other clients may also contact the well-known service port. The well-known ports are defined by convention overseen by the Internet Assigned Numbers Authority (IANA).

Also stored in RAM (168) and within the operating system (154) is a transmission controller (191) that generally includes computer program instructions for controlling transmission of TCP packets to and from a TCP port (195) of the computer (152). Specifically, the transmission controller (191) includes computer program instructions that when executed by the processor (156) cause the computer (152) to support TCP port sharing amongst a plurality of applications (193) in accordance with embodiments of the present invention by: receiving, from a client, a first TCP packet that includes an indication of a new TCP connection for a TCP port; determining an origination of the first TCP packet; identifying a TCP sequence number range associated with the determined origination; selecting an initial sequence number (ISN) within the identified TCP sequence number range; and sending, to the client, a second TCP packet that includes the selected ISN.

The operating system (154), the transmission controller (191), and the plurality of applications (193) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for sharing a transmission control protocol (TCP) port by a plurality of applications according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (109), which is an example of an I/O adapter specially designed for graphic output to a display device (180) such as a display screen or computer monitor. Video adapter (109) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for sharing a transmission control protocol (TCP) port by a plurality of applications according to embodiments of the present invention include modems for wired dial-up communications, Ethernet (IEEE 802.3) adapters for wired data communications network communications, and 802.11 adapters for wireless data communications network communications.

Figure 2:
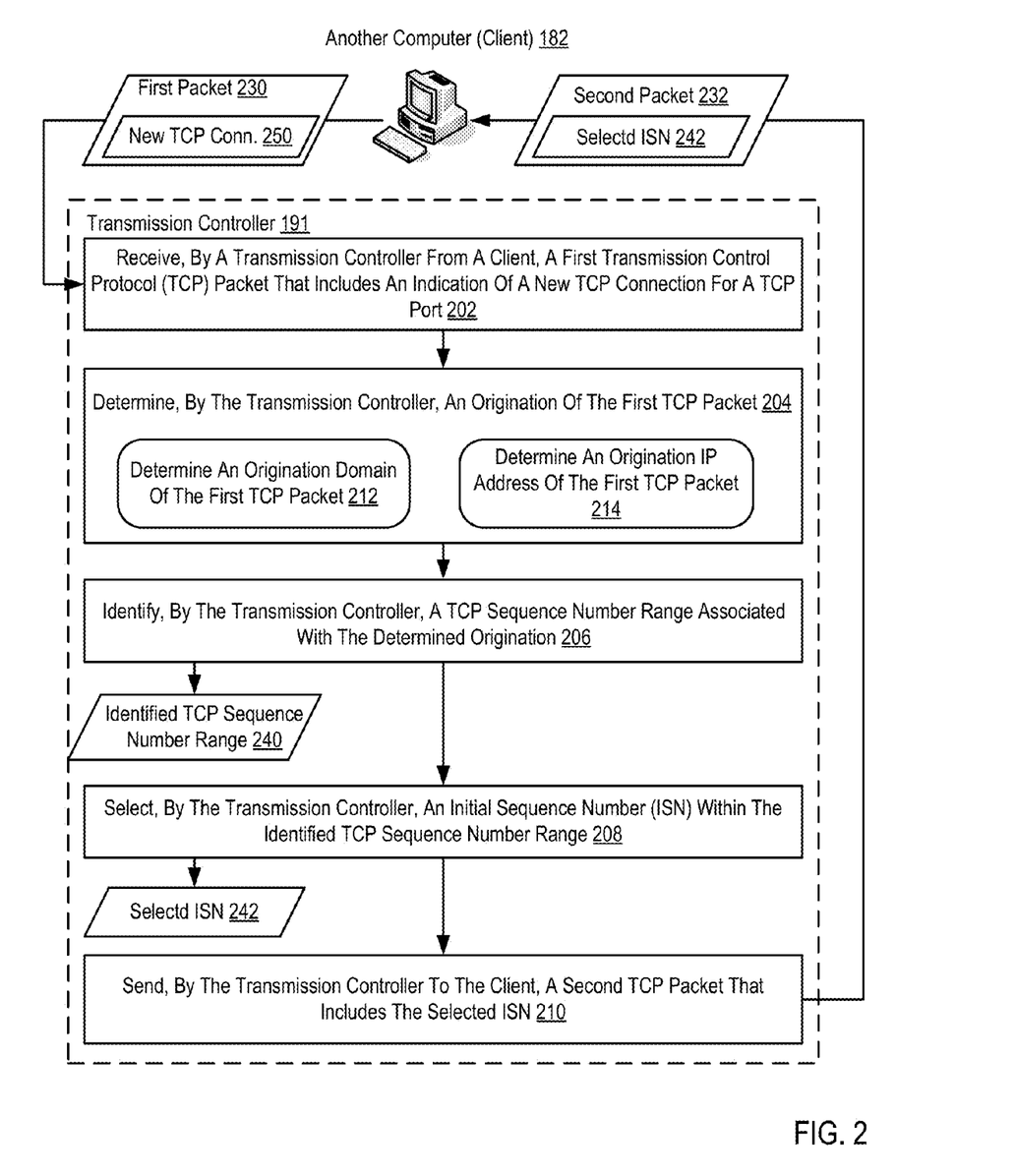
FIG. 2 sets forth a flow chart illustrating an exemplary method for sharing a TCP port by a plurality of applications according to embodiments of the present invention.

For further explanation, FIG. 2 sets forth a flow chart illustrating an exemplary method for sharing a transmission control protocol (TCP) port by a plurality of applications according to embodiments of the present invention. The method of FIG. 2 includes receiving (202), by a transmission controller (191) from a client (182), a first TCP packet (230) that includes an indication (250) of a new TCP connection for a TCP port (195). Receiving (202) a first TCP packet (230) that includes an indication (250) of a new TCP connection for a TCP port (195) may be carried out by receiving a TCP packet with a SYN flag set. For example, during a three-way handshake to establish a TCP connection, the first TCP packet received during the handshake has the SYN flag set.

The method of FIG. 2 also includes determining (204), by the transmission controller (191), an origination of the first TCP packet (230). In the method of FIG. 2, determining (204) an origination of the first TCP packet (230) may be carried out by determining (212), by the transmission controller (191), an origination domain of the first TCP packet (230). An origination domain, as the term is used in this specification, refers to an identification label that corresponds to one or more IP addresses. Examples of origination domains include ".ibm.com" and ".org." Determining (212) an origination domain of the first TCP packet (230) may be carried out by examining the header of the first TCP packet (230) to determine the domain of the client (182) that sent the first TCP packet (230).

Determining (204) an origination of the first TCP packet (230) may also be carried out by determining (214), by the transmission controller (191), an origination IP address of the first TCP packet (230). Determining (214) an origination IP address of the first TCP packet (230) may be carried out by examining the header of the first TCP packet (230) to determine the IP address of the client (182) that sent the first TCP packet (230).

The method of FIG. 2 includes identifying (206), by the transmission controller (191), a TCP sequence number range (240) associated with the determined origination. TCP uses a sequence number to identify each segment of data. The sequence number indicates the order of the segments sent from each computer so that the data can be reconstructed in order and then transmitted to an application. Identifying (206) a TCP sequence number range (240) associated with the determined origination may be carried out by examining a table that indicates TCP sequence number range assignments and determining a TCP sequence number range that corresponds with the origination. That is, a first TCP sequence number may correspond to all packets from a first IP address and a second TCP sequence number may correspond to all packets from a second IP address.

The method of FIG. 2 also includes selecting (208), by the transmission controller (191), an initial sequence number (ISN) (242) within the identified TCP sequence number range (240). Selecting (208) an ISN (242) within the identified TCP sequence number range (240) may be carried out by determining a starting number of the identified TCP sequence number range, determining an ending number of the identified TCP sequence number range, and selecting a number between or including the starting number and the ending number.

The method of FIG. 2 includes sending (210), by the transmission controller (191) to the client (182), a second TCP packet (232) that includes the selected ISN (242). Sending (210) a second TCP packet (232) that includes the selected ISN (242) may be carried out by transmitting a SYN-ACK TCP packet that includes a header with the selected ISN within the sequence number section. The transmission controller (191) may be configured to transmit the second packet (232) with a TCP header that includes a starting number and an ending number of the identified TCP sequence number range. By making the client (182) aware of the starting number and ending number of the identified TCP sequence number range, the client (182) will know the order of packets from the transmission controller (191). For example, the client (182) will be able to reorder received packets correctly such that a received packet that includes the ending TCP sequence number immediately precedes a received packet that includes the starting TCP sequence number.

During a three-way handshake to establish a TCP connection, in response to receiving a first TCP packet with the SYN flag set, the transmission controller (191) transmits a second packet that includes an ISN. According to embodiments of the present invention, the ISN is selected by the transmission controller (191) from a particular TCP sequence number range corresponding to the origination of the first TCP packet.

That is, multiple applications can share a TCP port by the transmission controller (191) dividing the TCP sequence numbers for a port into ranges for each application.

Figure 3:
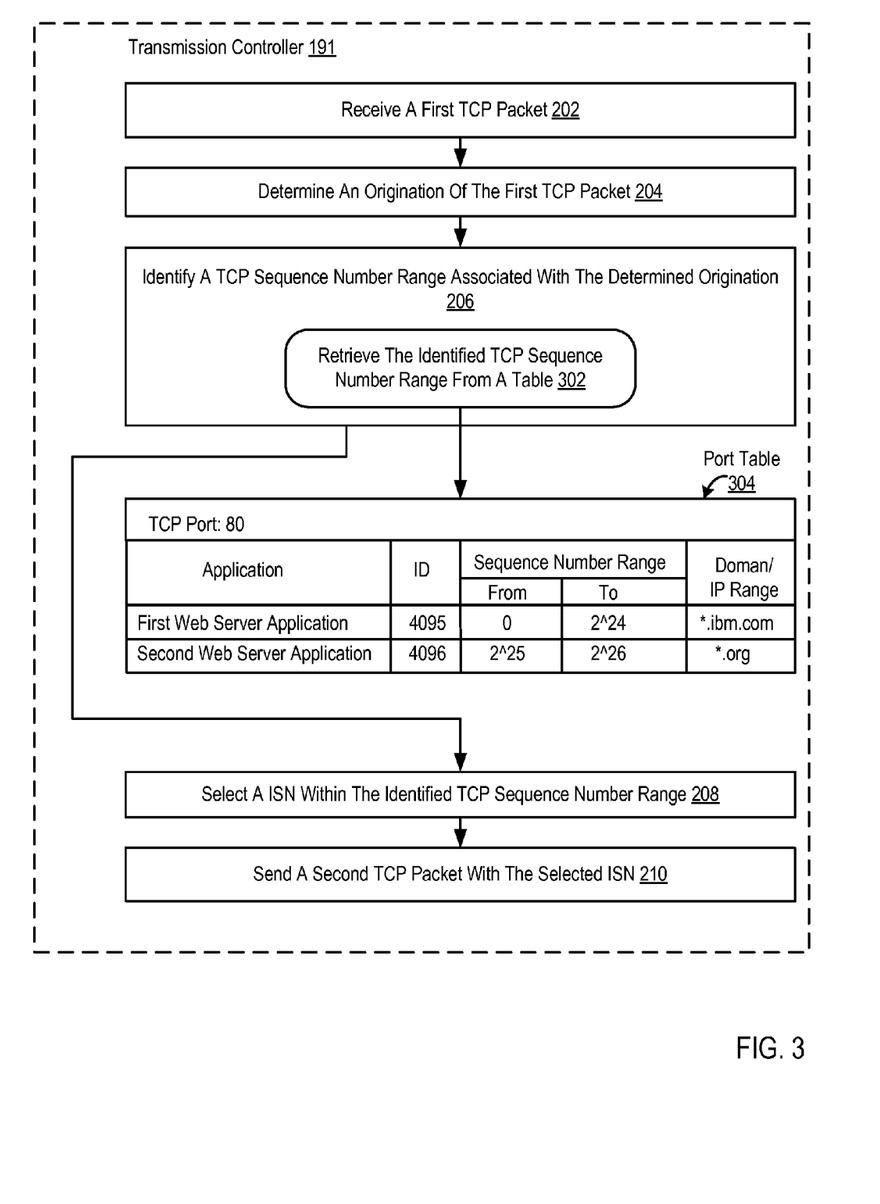
FIG. 3 sets forth a flow chart illustrating another example of a method for sharing a TCP port by a plurality of applications according to embodiments of the present invention.

For further explanation, FIG. 3 sets forth a flow chart illustrating another example of a method for sharing a transmission control protocol (TCP) port by a plurality of applications according to embodiments of the present invention. The method of FIG. 3 is similar to the method of FIG. 2 in that the method of FIG. 3 also includes receiving (202), a first TCP packet (230) that includes an indication (250) of a new TCP connection for a TCP port (195); determining (204) an origination of the first TCP packet (230); identifying (206) a TCP sequence number range (240) associated with the determined origination; selecting (208) an initial sequence number (ISN) (242) within the identified TCP sequence number range (240); and sending (210) a second TCP packet (232) that includes the selected ISN (242).

However, in the method of FIG. 3, identifying (206) a TCP sequence number range (240) associated with the determined origination includes retrieving (302), by the transmission controller (191), the identified TCP sequence number range (240) from a port table (304). Retrieving (302), by the transmission controller (191), the identified TCP sequence number range (240) from a port table (304) may be carried out by querying a port hash table. A port hash table may identify each application that is sharing a particular port. In the example of FIG. 3, the port table (304) illustrates applications that share TCP port 80 on the example computer (152) of FIG. 1. Each port may have a corresponding port table. A port table may indicate for each application sharing the port, a unique identifier, a TCP sequence number range, and an origination address (e.g., an origination domain or an origination IP address).

Figure 4:
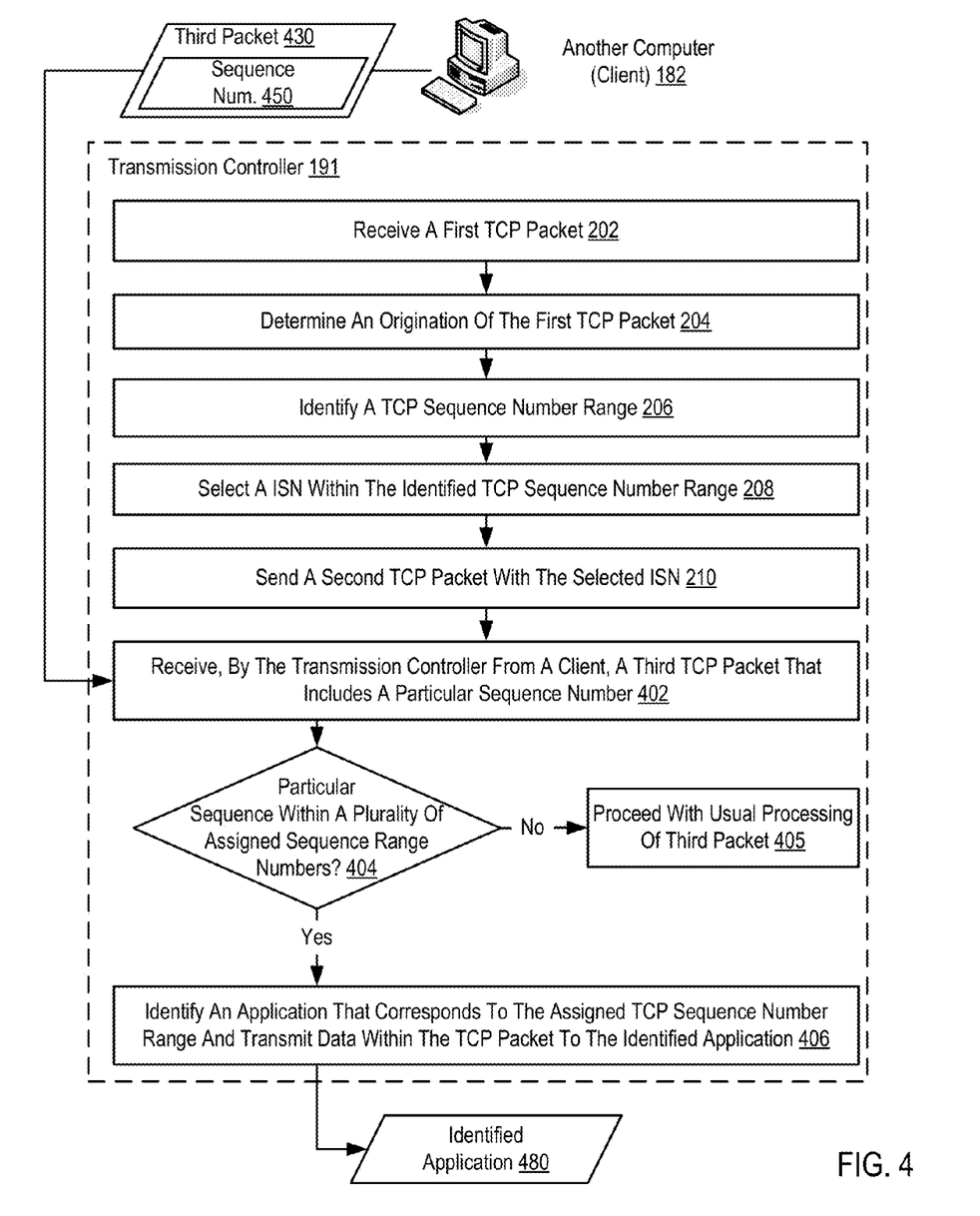
FIG. 4 sets forth a flow chart illustrating another example of a method for sharing a TCP port by a plurality of applications according to embodiments of the present invention.

For further explanation, FIG. 4 sets forth a flow chart illustrating a further exemplary method for sharing a transmission control protocol (TCP) port by a plurality of applications according to embodiments of the present invention. The method of FIG. 4 is similar to the method of FIG. 2 in that the method of FIG. 4 also includes receiving (202), a first TCP packet (230) that includes an indication (250) of a new TCP connection for a TCP port (195); determining (204) an origination of the first TCP packet (230); identifying (206) a TCP sequence number range (240) associated with the determined origination; selecting (208) an initial sequence number (ISN) (242) within the identified TCP sequence number range (240); sending (210) a second TCP packet (232) that includes the selected ISN (242).

The method of FIG. 4, however, includes receiving (402), by the transmission controller (191), a third TCP packet (450) that includes a particular sequence number (450). Receiving (402) a third TCP packet (450) that includes a particular sequence number (450) may be carried out by examining an acknowledgment number of the acknowledgement header section of the third packet (450).

The method of FIG. 4 includes determining (404), by the transmission controller (191), whether the particular sequence number (450) is within a plurality of assigned TCP sequence number ranges. Determining (404) whether the particular sequence number (450) is within a plurality of assigned TCP sequence number ranges may be carried out by determining if an acknowledgment number of the acknowledgement header section of the third packet (450) is within one of the assigned TCP sequence number ranges.

If the particular sequence number is within an assigned TCP sequence number range, the method of FIG. 4 includes identifying (406), by the transmission controller, an application that corresponds to the assigned TCP sequence number range and transmitting data within the third TCP packet (430) to the identified application (480). Identifying (406) the application that corresponds to the assigned TCP sequence number range and transmitting data within the third TCP packet (430) to the identified application (480) may be carried out by examining the assigned TCP sequence number ranges listed in a port table; matching an application with a TCP sequence number range; and extracting data within the third TCP packet for transmitting to the identified application.

If the particular sequence number is not within one of the plurality of assigned TCP sequence number ranges, the method of FIG. 4 includes proceeding (405), by the transmission controller (191), with usual processing of the third packet (430). Proceeding (405) with usual processing of the third packet (430) may be carried out by transmitting data within the third packet to a default application associated with the particular TCP port.

Figure 5:
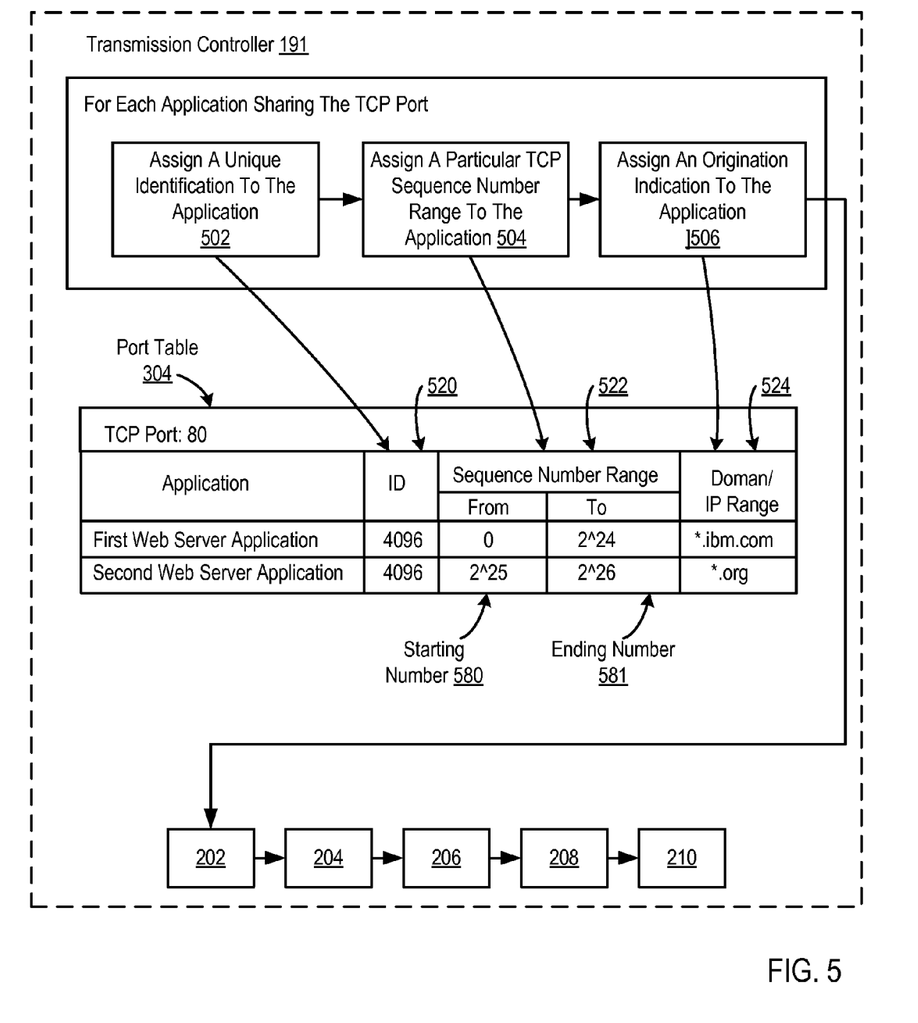
FIG. 5 sets forth a flow chart illustrating another example of a method for sharing a TCP port by a plurality of applications according to embodiments of the present invention.

For further explanation, FIG. 5 sets forth a flow chart illustrating a further exemplary method for sharing a transmission control protocol (TCP) port by a plurality of applications according to embodiments of the present invention. The method of FIG. 5 is similar to the method of FIG. 2 in that the method of FIG. 5 also includes receiving (202), a first TCP packet (230) that includes an indication (250) of a new TCP connection for a TCP port (195); determining (204) an origination of the first TCP packet (230); identifying (206) a TCP sequence number range (240) associated with the determined origination; selecting (208) an initial sequence number (ISN) (242) within the identified TCP sequence number range (240); sending (210) a second TCP packet (232) that includes the selected ISN (242).

The method of FIG. 5, however, includes for each application sharing the TCP port assigning (502), by the transmission controller (191), a unique identification (520) to the application. Assigning (502) a unique identification (520) to the application may be carried out by storing a unique identification (520) for an application within a port table (304).

The method of FIG. 5 also includes assigning (504), by the transmission controller (191), a particular TCP sequence number range (522) to the application. Assigning (504) a particular TCP sequence number range (522) to the application may be carried out by dividing the entire TCP sequence number available to a port into multiple ranges, each range corresponding to an application sharing the port; storing a particular TCP sequence number range (522) for an application within a port table (304); and assigning a starting number (580) and an ending number (582).

The method of FIG. 5 includes assigning (506), by the transmission controller (191), an origination indication (524) to the application. Assigning (506) an origination indication (524) to the application may be carried out by storing an origination indication (524) for an application within a port table (304).

Exemplary embodiments of the present invention are described largely in the context of a fully functional computer system for sharing a transmission control protocol (TCP) port by a plurality of applications. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for sharing a transmission control protocol (TCP) port by a plurality of applications, the apparatus comprising a computer processor, a computer memory operatively coupled to the computer processor, the computer memory having disposed within it computer program instructions that, when executed by the computer processor, causes the apparatus to carry out the steps of:

receiving, by a transmission controller from a client, a first TCP packet that includes an indication of a new TCP connection for a TCP port;

determining, by the transmission controller, an origination of the first TCP packet;

identifying, by the transmission controller, a TCP sequence number range associated with the determined origination, wherein the TCP sequence number range comprises one of a plurality of TCP sequence number ranges;

selecting, by the transmission controller, an initial sequence number (ISN) within the identified TCP sequence number range; and sending, by the transmission controller to the client, a second TCP packet that includes the selected ISN.

2. The apparatus of claim 1 wherein determining an origination of the first TCP packet includes determining, by the transmission controller, an origination domain of the first TCP packet.

3. The apparatus of claim 1 wherein determining an origination of the first TCP packet includes determining, by the transmission controller, an origination Internet Protocol (IP) range of the first TCP packet.

4. The apparatus of claim 1 further comprising computer program instructions that, when executed, causes the apparatus to carry out the steps of:

receiving, by the transmission controller from a client, a third TCP packet that includes a particular sequence number;

determining, by the transmission controller, whether the particular sequence number is within a plurality of assigned TCP sequence number ranges; and if the particular sequence number is within an assigned TCP sequence number range, identifying an application that corresponds to the assigned TCP sequence number range and transmitting data within the third TCP packet to the identified application.

5. The apparatus of claim 1 further comprising computer program instructions that, when executed, causes the apparatus to carry out the steps of:

for each application sharing the TCP port:

assigning, by the transmission controller, a unique identification to the application;

assigning, by the transmission controller, a particular TCP sequence number range to the application; and assigning, by the transmission controller, an origination indication to the application.

6. The apparatus of claim 1 wherein the second packet includes a starting number and an ending number of the identified TCP sequence number range.

7. The apparatus of claim 1 wherein determining a TCP sequence number range associated with the determined origination includes retrieving, by the transmission controller, the identified TCP sequence number range from a port table.

8. A computer program product for sharing a transmission control protocol (TCP) port by a plurality of applications, the computer program product disposed upon a computer readable storage medium, wherein the computer readable storage medium is not a signal, the computer program product comprising computer program instructions that, when executed, cause a computer to carry out the steps of:

receiving, by a transmission controller from a client, a first TCP packet that includes an indication of a new TCP connection for a TCP port;

determining, by the transmission controller, an origination of the first TCP packet;

identifying, by the transmission controller, a TCP sequence number range associated with the determined origination, wherein the TCP sequence number range comprises one of a plurality of TCP sequence number ranges;

selecting, by the transmission controller, an initial sequence number (ISN) within the identified TCP sequence number range; and sending, by the transmission controller to the client, a second TCP packet that includes the selected ISN.

9. The computer program product of claim 8 wherein determining an origination of the first TCP packet includes determining, by the transmission controller, an origination domain of the first TCP packet.

10. The computer program product of claim 8 wherein determining an origination of the first TCP packet includes determining, by the transmission controller, an origination Internet Protocol (IP) range of the first TCP packet.

11. The computer program product of claim 8 further comprising computer program instructions that, when executed, cause a computer to carry out the steps of:

receiving, by the transmission controller from a client, a third TCP packet that includes a particular sequence number;

determining, by the transmission controller, whether the particular sequence number is within a plurality of assigned TCP sequence number ranges; and if the particular sequence number is within an assigned TCP sequence number range, identifying an application that corresponds to the assigned TCP sequence number range and transmitting data within the third TCP packet to the identified application.

12. The computer program product of claim 8 further comprising computer program instructions that, when executed, cause a computer to carry out the steps of:

for each application sharing the TCP port:

assigning, by the transmission controller, a unique identification to the application;

assigning, by the transmission controller, a particular TCP sequence number range to the application; and assigning, by the transmission controller, an origination indication to the application.

13. The computer program product of claim 8 wherein the second packet includes a starting number and an ending number of the identified TCP sequence number range.

* * * * *